United States Patent [19]

Sunnen et al.

[11] Patent Number: 4,555,875
[45] Date of Patent: * Dec. 3, 1985

[54] MEANS FOR ATTACHING A REPLACEABLE STONE AND/OR GUIDE ASSEMBLY TO A MASTER HOLDER

[75] Inventors: Robert M. Sunnen, Frontenac; Duane W. Woltjen, Manchester, both of Mo.

[73] Assignee: Sunnen Products Company, St. Louis, Mo.

[*] Notice: The portion of the term of this patent subsequent to Mar. 19, 2002 has been disclaimed.

[21] Appl. No.: 712,927

[22] Filed: Mar. 18, 1985

Related U.S. Application Data

[63] Continuation of Ser. No. 497,067, May 23, 1983, abandoned.

[51] Int. Cl.⁴ .......................................... B24B 33/08
[52] U.S. Cl. ........................................ 51/331; 51/204; 51/347; 29/256; 29/264; 29/283.5; 411/15; 411/501
[58] Field of Search ................... 51/204, 206.4, 206.5, 51/331, 338–354; 403/248, 249, 250, 251, 277, 16; 29/243.5, 243.52, 256, 263, 264, 267, 283.5, 413, 426.5, 523; 411/15, 44, 57, 60, 349, 501

[56] References Cited

U.S. PATENT DOCUMENTS

| Re. 19,149 | 4/1934 | Jeschke | 51/378 |
|---|---|---|---|
| 1,472,833 | 11/1923 | Herold | 29/267 X |
| 1,753,780 | 4/1930 | Fisher | 29/264 X |
| 1,918,077 | 7/1933 | Agostoni | 51/339 |
| 2,038,274 | 4/1936 | Fitzsimmons | 29/523 |
| 2,143,176 | 1/1939 | Welsmiller | 29/523 |
| 2,641,379 | 6/1953 | Barbaro | 411/57 X |
| 2,684,527 | 7/1954 | Hedlund | 29/426.5 X |
| 3,193,921 | 7/1965 | Kahn | 403/277 X |
| 3,203,451 | 8/1965 | Vincent | 29/523 X |
| 3,403,483 | 10/1968 | Gjertsen et al. | 51/347 |
| 4,437,220 | 3/1984 | Gregory | 29/426.5 |
| 4505076 | 3/1985 | Sunnen | 51/331 X |

FOREIGN PATENT DOCUMENTS

413403 7/1934 United Kingdom .................. 411/60

Primary Examiner—Robert P. Olszewski
Attorney, Agent, or Firm—Haverstock, Garrett & Roberts

[57] ABSTRACT

A mounting assembly for attaching a first member to a second member such as for attaching a disposable work engaging assembly to a master holder assembly comprising a first member having opposed surfaces and at least one opening extending therethrough between the opposed surfaces, a second member formed of a malleable material having a corresponding number of tubular portions projecting therefrom at locations to register with and to be insertable into the openings in the first member, each of the tubular portions having a passageway extending therethrough formed at least in part by a non-round portion in the area thereof that extends through the opening in the first member, and a tool member having a work engaging end portion adapted to be positioned extending respectively into each of the passageways extending through the tubular portions, rotation of the tool member forcing the tool work engaging end portion into engagement with the non-round portion of the passageway extending through each of the tubular portions thereby permanently plastically deforming the non-round portion of each tubular portion and radially expanding each tubular portion outwardly into engagement with the corresponding opening in the first member to make a tight connection therebetween.

29 Claims, 21 Drawing Figures

MEANS FOR ATTACHING A REPLACEABLE STONE AND/OR GUIDE ASSEMBLY TO A MASTER HOLDER

This is a continuation of co-pending application Ser. No. 497,067 filed on May 23, 1983, now abandoned.

BACKGROUND AND SUMMARY OF THE INVENTION

The present invention relates to an improved means for attaching replaceable stone and/or guide assemblies to master holders and, more particularly, to novel attaching means wherein each stone and/or guide assembly includes spaced tubular projections formed on one surface thereof at locations to register with and to be insertable into corresponding openings extending through the associated master holder, said tubular projections being made of a malleable or ductile material and each including an opening extending therethrough having at least a portion thereof irregularly shaped. A simple novel swaging tool is utilized to permanently plastically upset and expand the malleable or ductile material associated with the irregularly shaped portion of the tubular projections so as to force said material outwardly into the corresponding openings in the master holder to which it is being attached. The camming action produced by rotation of the swaging tool cams the respective surfaces of the tubular projections and the openings through the master holder against each other thereby providing a positive driving connection therebetween. Simple removal means for detaching the disposable stone and/or guide assemblies from their respective master holders are also disclosed.

Honing mandrels and other similar devices having stone and guide assemblies mounted thereon are well known and have been used for many years. A wide variety of mandrels and like devices have been designed and manufactured so as to be adjustable to maintain the stone and/or guide assemblies in contact under pressure with the work surfaces being honed. Typical of such mandrel constructions are those devices which utilize single radially adjustable stone assemblies, while other such devices utilize a plurality of circumferentially spaced stone and/or guide assemblies, one or more of which are radially adjustable during a particular honing operation to maintain the stone and/or guide assemblies in contact under pressure with a work surface being honed. Many known stone and guide assemblies and stone and guide assembly movement means have been devised and used in the past including those disclosed in Sunnen U.S. Pat. Nos. Re. 18,763; 1,902,194; 1,904,336; 1,946,041; 1,982,836; 2,040,281; 2,815,615; 3,378,962; co-pending U.S. patent application Ser. No. 314,856, filed Oct. 26, 1981 and co-pending U.S. patent application Ser. No. 415,488, filed Sept. 7, 1982, both of which are assigned to Applicants' assignee, Sunnen Products Company. Some of the known constructions have the stone and guide members fixedly mounted on holder members which are then mounted on a honing mandrel or head, or other similar device, in various ways. With such known constructions, as the stones and guides wear out, the stone and/or guide assemblies, which usually include the mounting means therefor, are either discarded or the old stones and guides are removed therefrom and new members attached thereto. These procedures are wasteful and expensive to the user especially in those cases where the stone and guide assemblies include expensive metal backing and support means.

Although the attachment means disclosed in co-pending Sunnen U.S. patent application Ser. No. 314,856, filed Oct. 26, 1981, seeks to overcome such waste and expense by teaching the construction and attachment of a novel replaceable honing stone assembly, certain disadvantages and shortcomings still exist. For example, Sunnen U.S. patent application Ser. No. 314,856 discloses a work engaging stone assembly for mounting on a honing mandrel or like device comprising a replaceable stone assembly and a reusable master stone holder, the stone assembly including spaced tubular projections formed on one surface thereof at locations to register with and to be insertable into respective spaced openings formed in the master stone holder. Threaded fastener members or a special threaded tool are utilized for threading into each respective tubular projection when said projections are positioned extending into the spaced openings formed in the master stone holder. When so threaded, the fastener members or the threaded tool form threads into the tubular projections of the stone assembly and simultaneously expand said tubular projections outwardly into the respective openings in the master stone holder to make a firm tight connection therewith. The various methods disclosed in the above-identified pending case for attaching a replaceable stone assembly to a master stone holder typically require the threaded members and/or the threaded tool to be rotated through numerous revolutions in order to sufficiently thread said members through the tubular projections of the stone assembly so as to adequately permanently plastically flare outwardly the soft material associated therewith against the walls of the master stone holder. In addition, it has been found that rotation of the threaded fastener members and/or the special threaded tool is still somewhat time consuming due to the fact that these members must be rotated through numerous revolutions. This operation, although a great improvement, still requires some manual dexterity and physical strength in manipulating the associated threaded members and/or the inserting tool for achieving both proper attachment and removal of the stone assembly to and from its corresponding master holder. This is not true of the present construction as will be hereinafter explained.

The present construction overcomes these and other disadvantages and shortcomings of the known constructions by teaching novel means for drivingly attaching a replaceable stone and/or guide assembly to a master holder without the use of threaded fastener members to accomplish the same and without requiring threaded members to be left on the assemblies. Instead, the replaceable stone and/or guide assemblies of the present invention each include at least one and usually two or more spaced tubular projections formed on one surface thereof at locations to register with and to be insertable into corresponding openings extending through the master holders, said tubular projections each including an opening extending therethrough having at least a portion of its length of an irregular or non-round cross-sectional shape defined by sidewall portions of varying contour extending therearound. The replaceable stone and/or guide assemblies of the present invention are attached to master holders by using a simple novel swaging tool which includes a camming surface at one end portion thereof adaptable for engaging the openings in the projections and, when rotated, to permanently upset and plastically expand the malleable or ductile material associated with the irregular shaped portions of the tubular projection openings so as to force said material outwardly or sideways into engagement with the respective openings in the master holder for achieving a tight firm connection therewith. Simple rotation of the swaging tool through approximately 180° of rotation cams and permanently deforms the relative surfaces of the tubular projections and the openings througn the master holder against each other, and such manner of attachment does not require the use of any threaded members or the like as previously disclosed in the above-identified pending case. Additionally, since the camming surface of the swaging tool is only squeezing and reshaping the malleable or ductile metal associated with the tubular projections of the replaceable stone and/or guide assemblies and such tool is not physically forming threads as previously required in using the special tool described in the above-identified pending case, rotation of the swaging tool of the present invention is considerably easier and less time consuming and can be conveniently and easily accomplished by users possessing ordinary manual skills and by persons having little training or ability. The present method therefore can be quickly and easily accomplished while at the same time providing a positive driving connection under pressure between the replaceable stone and/or guide assemblies and their master holders.

When the stones of the present device wear and need replacing, the replaceable stone and/or guide assemblies can be quickly separated from their respective master holders and can be replaced by another similar stone and/or guide assembly. This results in minimal waste to the customer and, because of the inexpensive cost of the replaceable stone and/or guide assemblies, makes it uneconomical to remount stones and/or guides on existing backing members which is time consuming, expensive and requires special equipment and materials. Also, since the backing material to which the stones and/or guides are attached is relatively inexpensive and is normally damaged by use, there is little to be lost by discarding it rather than trying to reuse it by removing the worn stones or shoes and replacing them with new ones.

It is therefore a principal object of the present invention to provide improved means for attaching members together.

Another object is to provide a relatively inexpensive replaceable stone and/or guide assembly for mounting on master holders, which assemblies are drivingly connected to their respective master holders without requiring or using threaded members.

Another object is to provide novel means for attaching a disposable stone assembly to a master stone holder.

Another object is to provide novel means for attaching a replaceable guide assembly to a master guide holder.

Another object is to reduce the time and effort required to install a honing stone and/or guide assembly on a holder device in order to restore a honing device to a like-new operating condition.

Another object is to make it possible to attach a replaceable stone and/or guide assembly to a master holder using a simple novel swaging tool.

Another object is to teach the construction of a simple novel swaging tool for use in attaching replaceable stone and/or guide assemblies to master holders, said swaging tool being easily and quickly inserted and rotated within openings extending through the tubular projections formed within the stone and/or guide assemblies to effect a positive driving connection between the stone and/or guide assemblies and their respective master holders.

Another object is to make it possible to attach a replaceable stone and/or guide assembly to a master holder by a one time rotation of a swaging tool through a predetermined angle usually about 180°.

Another object is to prevent mounting a stone and/or guide assembly in a wrong position on a master holder.

Another object is to provide novel means for attaching and detaching replaceable stone and/or guide assemblies to and from reusable master holders without requiring that the entire honing assembly be removed from the mandrel or honing head on which it is mounted.

Another object is to reduce the expense of maintaining a honing mandrel in an operative condition.

Another object is to provide novel means for removing the disposable stone and/or guide assemblies from their respective master holders.

Another object is to make it uneconomical to remount stones and/or guides on existing holder devices.

Another object is to provide a novel attaching means which may be utilized in other applications.

BRIEF DESCRIPTION OF THE DRAWINGS

These and other objects and advantages of the present invention will become apparent to those skilled in the art after considering the following detailed specification which discloses several embodiments of the subject device in conjunction with the accompanying drawings wherein.

DESCRIPTION OF THE PREFERRED EMBODIMENTS

Figure 1:
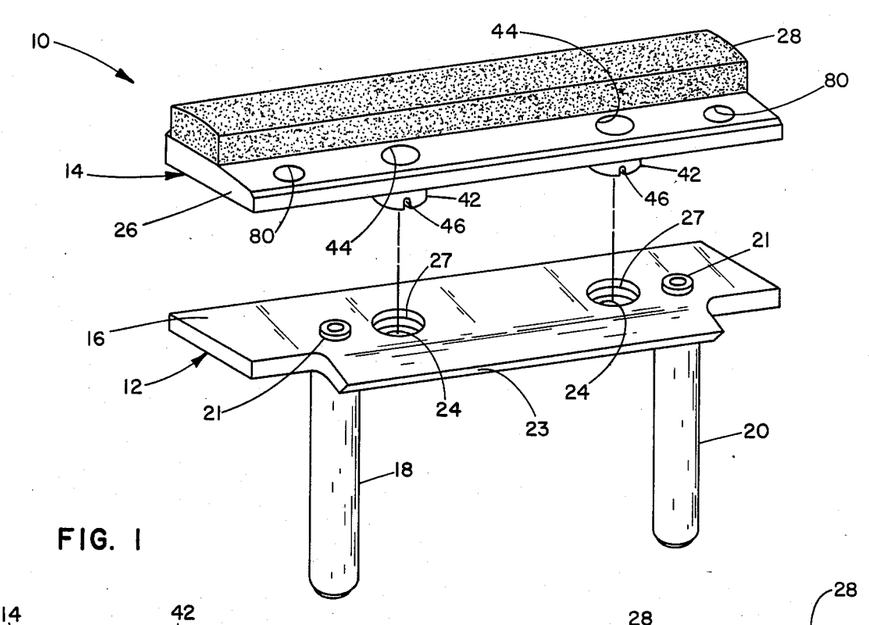
FIG. 1 is an exploded perspective view of a honing stone assembly and a master holder therefor constructed according to the teachings of the present invention.
Figure 4:
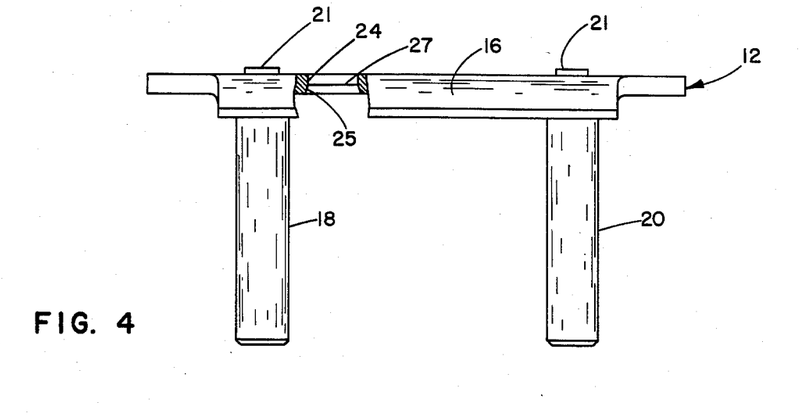
FIG. 4 is a front elevational view, partly in section, of the master holder only shown in FIGS. 1-3.
Figure 5:
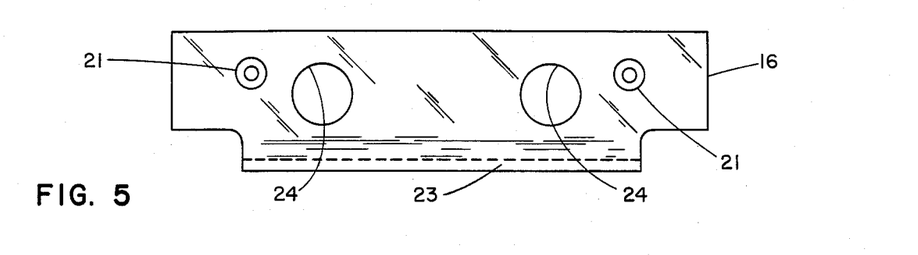
FIG. 5 is a top plan view of the master holder shown in FIG. 4.

Referring to the drawings more particularly by reference numbers wherein like numerals refer to like parts, FIG. 1 illustrates a construction 10 comprising a reusable master holder 12 and a replaceable stone assembly 14 for mounting thereon, both of which are constructed according to the teachings of the present invention. The master holder 12 includes an elongated substantially rectangular plate 16 upon which the stone assembly 14 is mounted, and it has attached thereto adjacent its opposite end portions spaced mounting members which are shown as rack gear members 18 and 20 as illustrated in FIGS. 1–4. Although the gear members 18 and 20 may be attached to the plate 16 by any suitable means, it is generally preferred that these attachments be made by staking as at 21 so as to make a secure connection therebetween. The gear members 18 and 20 also include a plurality of gear teeth such as the teeth 22 (FIG. 3) formed along corresponding sides thereof to engage with a pinion gear (not shown) located in a honing mandrel or other similar device. The pinion gear operates to radially move the stone assembly 14 during a honing operation so as to both maintain the stones associated therewith engaged with the work surface under pressure and retract the stones when the mandrel is to be withdrawn from or inserted into a work piece. The plate 16 of the master holder 12 is shown having a pair of similar openings or bores 24 extending therethrough as shown in FIGS. 1, 4 and 5, which bores 24 are utilized for mounting the replaceable stone assembly 14 onto the master holder 12 as will be explained. The bores 24 are shown as being cylindrical over a portion of their length and are tapered outwardly over at least a portion thereof as at 25, the intersection of said portions forming a lip or edge 27 as best shown in FIG. 4. In some embodiments the leading edge portion 23 of the plate 16 may be sloped forwardly and downwardly as shown in FIG. 3, or in any other manner, to increase the stiffness of the holder plate 16, although this feature is not required and will not affect the teachings and practice of the present invention.

The replaceable stone assembly 14 includes a stone mounting or backing member 26, usually constructed to include some of a relatively inexpensive material such as zinc, aluminum or some other like malleable or ductile material, with one or more honing stones such as the honing stone 28 mounted thereon. Although the stone 28 can be attached to the mounting member 26 by a variety of suitable means, it is preferred that the stone 28 be adhesively attached to the member 26 such as by locating and holding said members in their proper joined position through the use of a jig, locating ridges, or other like means. The mounting or backing member 26, the details of which are shown in FIGS. 6–10, includes a surface 30 which is the surface to which the stone 28 is attached in some manner as hereinbefore explained and an opposed surface 32 (FIGS. 9 and 10) which abuts the upper surface of the plate 16 when installed thereon. The surface 30 is substantially flat and extends the full length of the member 26. An upwardly projecting stone locating ridge 34 extends partially along one side of the surface 30 adjacent each opposite end thereof and the stone 28 is positioned thereagainst to locate it as shown in FIGS. 1 and 3. The edge of the surface portion 30 opposite the ridges 34 extends to adjacent a sloping surface 36 and the surface 36 extends therefrom to adjacent the forward or leading edge 38 of the member 26 as shown in FIG. 9. The sloping surface 36 may also include a beveled portion 40 (FIG. 9) adjacent the forward edge 38.

Figure 7:
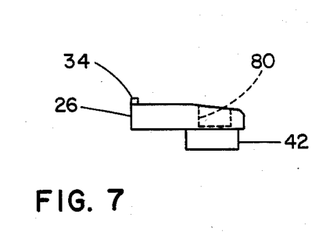
FIG. 7 is a left end elevational view of the backing member shown in FIG. 6.
Figure 8:
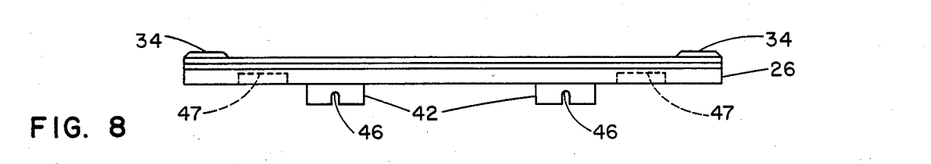
FIG. 8 is a front elevational view of the backing member shown in FIG. 6.
Figure 9:
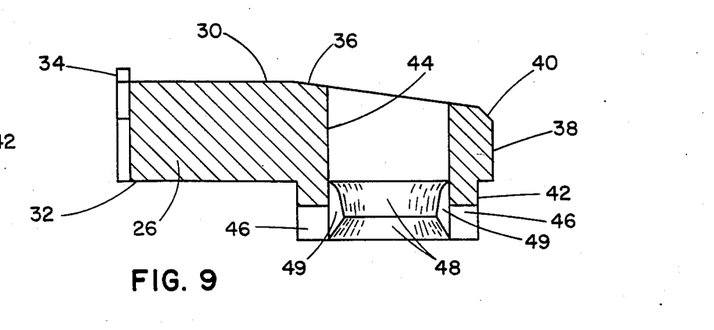
FIG. 9 is an enlarged cross-sectional view taken along line 9—9 of FIG. 6.
Figure 10:
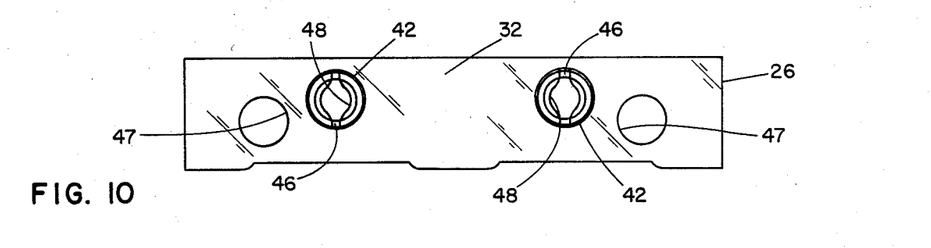
FIG. 10 is a bottom plan view of the backing member shown in FIGS. 6-9.

The surface 32 of the backing member 26 includes two similar integral tubular projections 42 attached thereto and extending therefrom as clearly shown in FIGS. 7–9. Although the tubular projections 42 may extend through and beyond the holder plate 16 in some applications as will be hereinafter explained, preferably the projections 42 extend from the surface 32 a distance slightly less than the thickness of the plate member 16, and the projections 42 are spaced apart and dimensioned so that they will extend into the respective bores 24 (FIGS. 1 and 2) when the assemblies 12 and 14 are placed in mating contact with each other. Each projection 42 includes a cylindrical passageway or opening 44 formed therein and extending therethrough, each passageway 44 also extending through the body portion of the member 26 as best shown in FIG. 9. Each of the tubular projections 42 also includes a pair of opposed slots or notches 46 formed extending partly from the free ends thereof as shown in FIGS. 8–10. A pair of spaced cavities or chambers 47 are also located extending from the surface 32 of the member 26 partway into the body portion of the member 26 as shown in FIGS. 8 and 10. The cavities 47 are positioned and sized to accommodate the staking projections 21 when the stone assembly 14 is mounted flush on the master holder 12.

At least a portion of each opening 44 which extends through the tubular projections 42 has an irregular cross-sectional shape defined by one or more sidewall portions that extend radially outwardly from the center thereof a distance further than other sidewall portions such as the sidewall portions 48 shown in FIG. 9. This means that the projections 42 will have different thicknesses at the locations of the portions 48. These irregular portions 48 are important to the present invention because it is these portions of the assembly 14 which are able to be forced sideways into engagement with the bores 24 of the master holder plate 16 as will be explained. Once the tubular projections 42 are positioned extending into respective ones of the bores 24, pressure is applied against the sidewall portions 48 by means of a tool to be described later so as to permanently upset and expand the malleable or ductile material in the projections 42 and in so doing to force said material plastically sidewardly into engagement with the bores 24. Use of a simple swaging tool such as any one of the tools 50, 64, and 72 shown in FIGS. 11, 13 and 14 as will be hereinafter explained can be used to effectively upset, expand and permanently deform the malleable or ductile material associated with the sidewall portions 48 into engagement with the bores 24.

It is important to note that as the sidewall portions 48 are forced sidewardly into engagement with the bores 24, some of the material associated therewith will be forced outwardly further than the rest so as to move into the larger diameter tapered portions 25 thereof. This makes for an even more positive connection between the stone assembly 14 and the master holder 12 which prevents them from coming apart, and it also makes for a relatively inexpensive construction that is easily and quickly installed. The bores 24 may also be countersunk or counterbored and this will produce substantially the same result as tapering the bores 24 as previously explained. In addition, in some applications, it may also be desirable to have the projections 42 extend through and beyond the back surface of the master holder plate 16 such that when the side wall portions 48 are expanded into engagement with the bores 24, some of the malleable material associated with the sidewalls 48 will be forced outwardly and sidewardly so as to move beyond the terminal ends of the bores 24 and onto the back surface thereof. This will likewise make for an even more positive connection between the stone assemblies 14 and the master holder 12.

The irregular shape of the portions 48 of the openings 44 are shown as being substantially oval in shape for illustrative purposes but it is also recognized that the portions 48 may be fashioned into a wide variety of shapes and configurations including, for example, a triangular, eliptical, hexagonal, or other non-round cross-sectional shape without departing from the teachings and practice of the present invention. The important thing is that the contour of the openings 44 in the area where they extend through the openings 24 in the plate 16 be such that they can be permanently plastically forced outwardly causing permanent deformation thereto to effect the desired connection.

Figure 11:
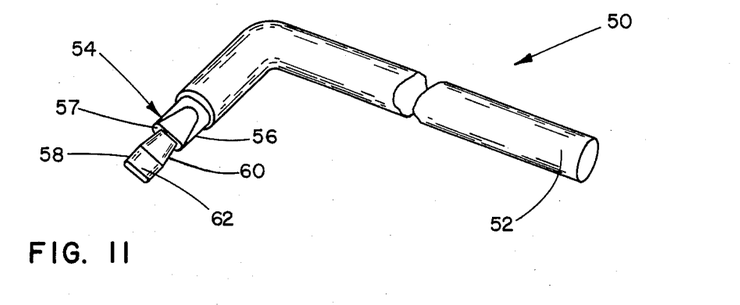
FIG. 11 is a perspective view of one embodiment of a swaging tool for use in attaching a replaceable stone assembly to a master holder.

FIG. 11 discloses one embodiment of a relatively simple swaging tool 50 which may be used for attaching the stone assembly 14 to the master holder 12. The tool 50 is substantially L-shaped and includes a handle portion 52 and a work engaging end portion 54. The end portion 54 includes a transition portion 56 and a swaging or camming portion 58. The transition portion 56 is tapered longitudinally becoming narrowest toward the end of the tool and extends to adjacent an intermediate edge 57 which is shown as being substantially oval in cross-section. The edge 57 is transversely dimensioned so as to be slightly larger than the diameter of the openings 44 such that when the end portion 54 of the tool 50 is inserted into and through the openings 44, the edge 57 will abut the surface 36 of the member 26 thereby preventing the end portion 54 from being further inserted. This therefore controls the penetration of the tool 50 into the projections 42 and establishes the proper position for the tool when it is used to complete the connection between the members 26 and 16.

The camming portion 58 of the tool 50 is likewise substantially oval or elongated in cross-section and includes a relief portion 60 and a working or camming surface portion 62. The relief portion 60 is reverse tapered as shown in FIG. 11 such that the end portion thereof which lies adjacent the edge 57 is the smaller end. The camming portion 58 is likewise dimensioned so as to be compatible with and insertable into and through the irregular portions 48 of the openings 44 in one direction only so that rotation of the tool portion 58 when so positioned will force the sidewall portions 48 outwardly into engagement with the bores 24. The shape including the tapering and size of the relief portion 60 is important to the present tool construction because it is these features which allow the tool portion 58 to not disturb the juxtaposition of the stone assembly 14 upon the master holder 12 during the attaching operation while using only ordinary attention to aligning the tool squarely with the openings 44. This provides a better latitude in alignment when inserting the tool into the openings 44. The said shape also facilitates easy removal of the tool from the openings 44 after use without jamming, binding or otherwise interfering with the sidewalls of the openings 44. The tool portion 54 is preferably of a one piece construction and is made of a relatively hard material such as steel or other similar material so that it can be repeatedly used with minimal wear.

Figures 12, 13, 14:
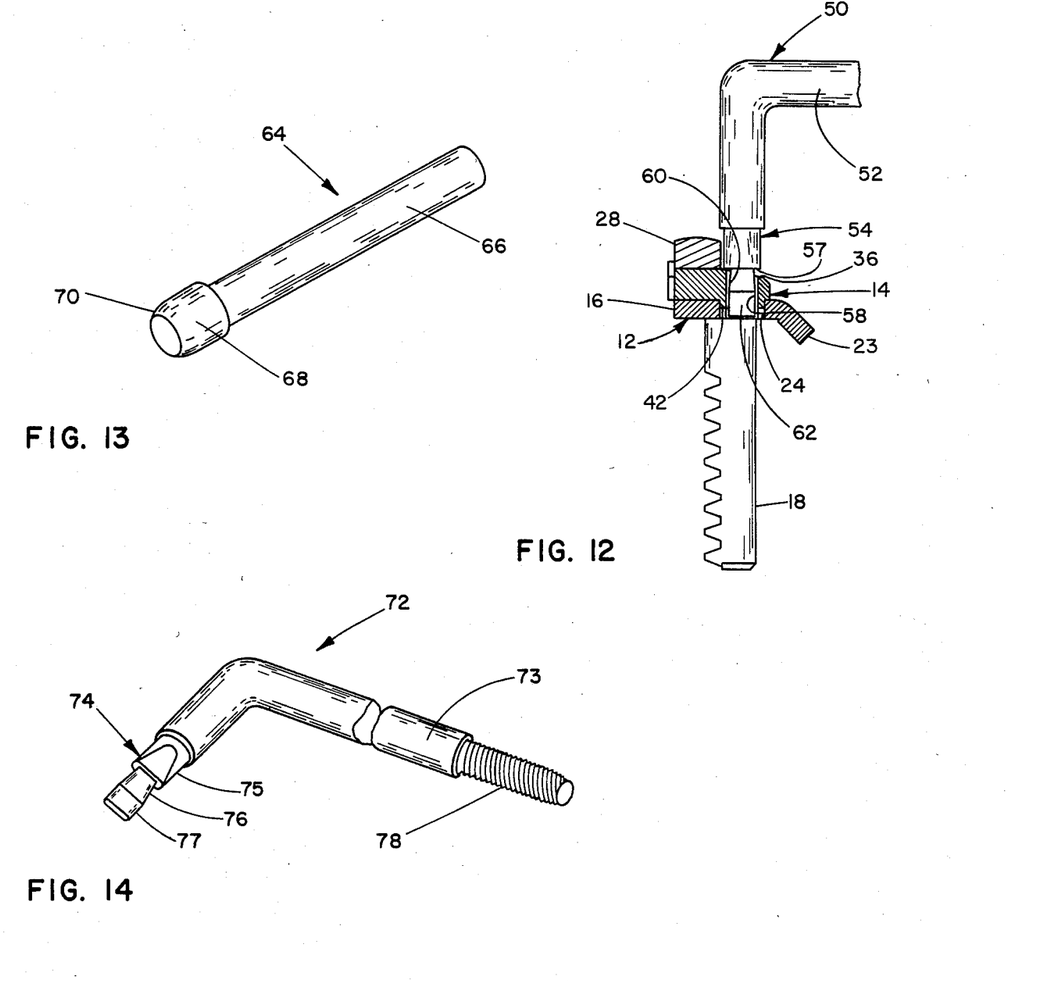
FIG. 12 is a cross-sectional view showing a replaceable stone assembly with a swaging tool positioned therein in position to attach the assembly to a master holder.
FIG. 13 is a perspective view showing another embodiment of a special tool for attaching a replaceable stone assembly to a master holder.
FIG. 14 is a perspective view of still another embodiment of a swaging tool similar to the swaging tool shown in FIG. 11.

FIG. 12 illustrates the position of the tool 50 in readiness for use. Once the tubular projections 42 are positioned in the respective bores 24 of the master holder 12, the working end of the tool 50 is inserted within the openings 44 on the accessible side thereof and into the irregular bore portions 48 as described. When so inserted, the edge 57 abuts the surface 36 (FIGS. 9 and 12) and prevents further insertion and the tool is ready for use. This is important because when the tool 50 is so positioned, the camming surface 62 is positioned adjacent the irregular portions 48 of the openings 44. In this regard, it is important that the camming surface 62 fully traverses the irregular shaped surface portions 48 as shown in FIG. 12. The surface portions 48 may also be cut away or relieved as at 49 (FIG. 9) to allow the working portion 58 of the tool 50 to move easily therethrough. It should also be noted that the slots or notches 46 are preferably located on the projections 42 so that when the tool portion 54 is inserted within the openings 44, the opposite end portions of the tool portion 58 align with the slots 46. The slots 46 facilitate the radial expansion of the relatively soft malleable or ductile material of the projections 42 during the camming action.

Once the tool 50 is inserted as shown in FIG. 12, the handle portion 52 can be used to forceably turn it, usually through approximately 180° of rotation, causing the camming surface portion 62 to upset and permanently plastically expand outwardly the relatively soft material from which the members 26 are formed. Once the camming action is accomplished for each projection 42, the tool 50 can be easily removed and inserted into any remaining openings 44 to effect engagement thereof with the master holder 12 in the same manner. This process is repeated until all of the irregular portions 48 associated with the openings 44 in the tubular projections 42 are engaged with the master holder 12. If the irregular shaped portions 48 of the openings 44 are fashioned into configurations other than oval configurations as shown, the shape of the work engaging end portion 54 of the tool 50 will usually be reshaped and dimensioned accordingly.

Since the swaging or camming portion 62 of the tool 50 need only be rotated approximately 180° within the irregular shaped bore portions 48, unlike the special tool disclosed in pending Sunnen U.S. patent application Ser. No. 314,856, much less effort need be used with the present tool to complete the attachment. In addition, since the tool portion 58 is only applying force to the metal in the area of the irregular portions 48, and it is not forming threads, rotation of the tool 50 is more easily accomplished. The present manner of attachment therefore can be quickly and easily accomplished while at the same time providing a positive driving connection between the master holder 12 and the replaceable stone assembly 14.

It is usually advantageous to dimension the tool portion 58 such that it does not extend or protrude appreciably beyond the free end portion of the tubular projections 42. This will eliminate the need for modifying certain mandrel bodies where the tool is to be used to make the attachments while the master holders remain attached to a honing mandrel. Additionally, although the projections 42 are shown and described as having the slots or notches 46, the slots 46 are not essential to the practice of the invention so long as the tool portion 58 is dimensioned so as to be insertable within the irregular portions 48 of the openings 44 and can be rotated therewithin to effect the necessary camming action as hereinbefore discussed. By the same token the number of notches 46 can be increased or decreased as desired.

FIG. 13 illustrates an alternate embodiment of a tool 64 which can be utilized for attaching the stone assembly 14 to the master holder 12. The tool 64 is a punch form type swaging tool having a substantially elongated cylindrical body 66 and a work engaging end portion 68. The work engaging portion 68 is substantially cylindrical in shape and is of a diameter substantially equal to or slightly less than the diameter of the openings 44 into which it will be inserted. In addition, the work engaging portion 68 must be of sufficient diameter or otherwise dimensioned such that when the tool 64 is moved through the respective openings 44, the tool portion 68 including especially the beveled or rounded end portion 70 thereof contacts the irregular bore portions 48 and is able to expand said portions outwardly into engagement with the bores 24 of the master holder 12 when axial force is applied to the member 64 by an instrument such as a hammer or press. Since the body portion 66 of the tool 64 is substantially smaller than the openings 44, once the malleable or ductile material associated with the irregular portions 48 is expanded into engagement with the master holder 12, the tool body 66 will be able to freely pass therethrough for removal. This method of attachment is advantageous in some cases because use of the tool 64 requires no tool rotation and can be easily and quickly driven through the irregular portions 48 of the openings 44 to effect engagement with the master holder 12. This form of tool however, may not be as suitable for making attachments when the master holder is on a mandrel when the attachment is made.

FIG. 14 illustrates still another embodiment of a tool 72 which can be utilized for both attaching the stone assembly 14 to and detaching it from the master holder 12. The tool 72 is L-shaped and includes a handle portion 73, a work engaging portion 74 and a threaded end portion 78. The end portion 74 is like the end portion 54 of the tool 50 and the threaded portion 78 is provided to detach the replaceable stone assembly 14 from a master holder 12 as will be explained.

Figure 15:
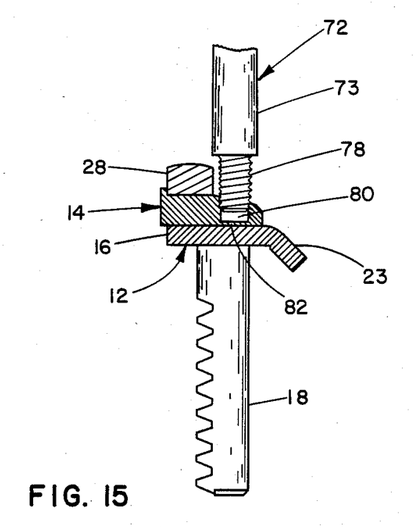
FIG. 15 is a cross-sectional view showing the swaging tool of FIG. 14 being used in a way to remove a stone assembly from a master holder.

In order to detach the stone assembly 14 from the master holder 12 as shown in FIG. 15, one or more counterbores or cavities such as counterbores 80 (FIGS. 1, 6, 7, and 15) are provided in the stone assembly 14 at spaced locations from the tubular projections 42 and at locations that are spaced from the honing stone or stones 28 as illustrated in FIGS. 1-6. The bores 80 are preferably non-threaded, although they can be threaded if desired, and are dimensioned to threadingly receive the threaded end portion 78 of the tool 72. When the tool is turned into one of the counterbores 80 it will form its own threads into the walls thereof as it advances therethrough and eventually will bear against the closed bottom 82 of the counterbore 80 punching it free and pushing it against the master holder 12 and in doing so prying the members 12 and 14 apart. The threads at the free end of the tool portion 78 may be tapered somewhat to facilitate starting said portion into the counterbores 80.

Figure 6:
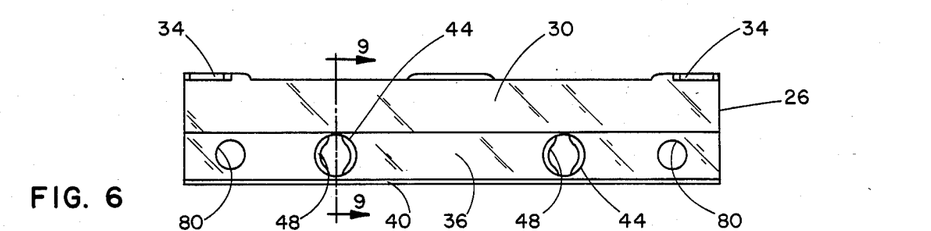
FIG. 6 is a top plan view of the backing portion of a replaceable stone assembly upon which a honing stone is mounted.

It is preferred that the counterbores or cavities 80 not extend all the way through the backing member 26 but have a narrow bottom portion or membrane such as the bottom portion 82. This means that when the threaded end portion 78 of the tool 72 is rotated within the respective counterbores 80, the end portion 78 will move against the portions 82 and not against the master holder 12. This operates to transfer the force applied by the hard tool through the softer membrane against the master holder plate 16 thereby minimizing damage to the master holder such as by wearing an identation into or otherwise scaring the master holder plate 16. It has been found that if the bores 80 stop approximately 0.010 to 0.015 inches short of the opposite side of the members 26, the portions of material 82 will easily separate therefrom as the tool portion 78 is rotated within each respective bore 80 to cushion the force applied against the master holders. One such counterbore or cavity 80 can be located adjacent to each of the tubular projections 42 as shown in FIGS. 1 and 6, although in some cases a single counterbore usually centrally located may be all that is necessary. The means described above can be utilized to separate any of the various stone and/or guide assemblies described herein from their respective master holders. It is anticipated, however, to use bores or cavities 80 that extend completely through the backing members 26 but this is not generally preferred because it may result in some damage to the master holders after repeated use.

It is important to the present invention that the master holder 12 be reusable since this portion is preferably made of relatively hard steel and is a relatively expensive part. The only replaceable portion is the stone assembly 14 which includes the relatively inexpensive backing member 26, which is molded or die cast, and the stones 28 which are the portions that engage the work surface and undergo wear. The stone assemblies 14 can be mass produced relatively inexpensively, the backing 26 being of a malleable or ductile material which can be upset and permanently deformed without breaking as aforesaid. It is expected that some irreparable damage will occur to the tubular projections 42 on the stone assemblies when the assemblies 14 are detached from the master holders 12. This limits the ability to reattach the same stone assembly 14 repeatedly, although it may be possible in some cases if care is used to reattach a stone assembly a time or two but this is usually not feasible. Therefore, in the usual situation, once the stone assembly 14 has been attached to the master holder 12, it will not be necessary or desirable to reattach the same stone assembly to the same or to a different master holder.

The size and/or spacing and/or locations of the bores 24 and of the tubular projections 42 may be selected to prevent both improper mounting and the mounting of wrong stone assemblies on a master holder. For example, if the locations of the bores 24 and the respective tubular projections 42 are offset toward one end of the device or toward one side the operator will be prevented from accidentally or inadvertently mounting a stone assembly backwards on a master holder.

Figure 2:
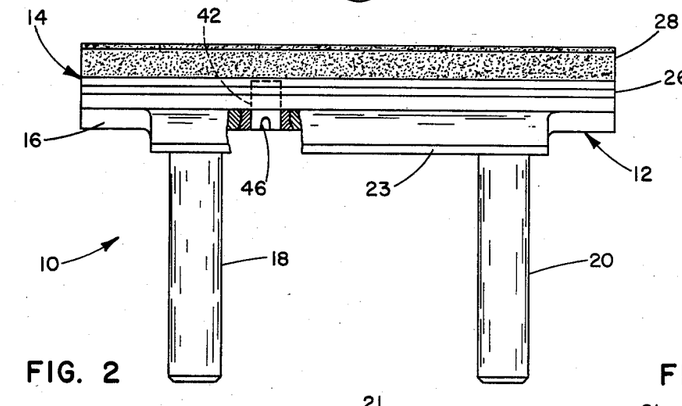
FIG. 2 is a front elevational view, partly in section, of the stone assembly and master holder of FIG. 1 showing said members in attached condition.
Figure 3:
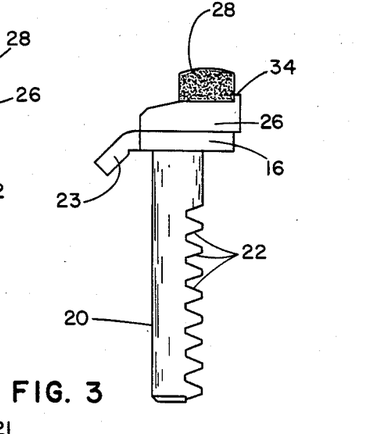
FIG. 3 is a right end elevational view of the construction shown in FIG. 2.
Figures 16, 17:
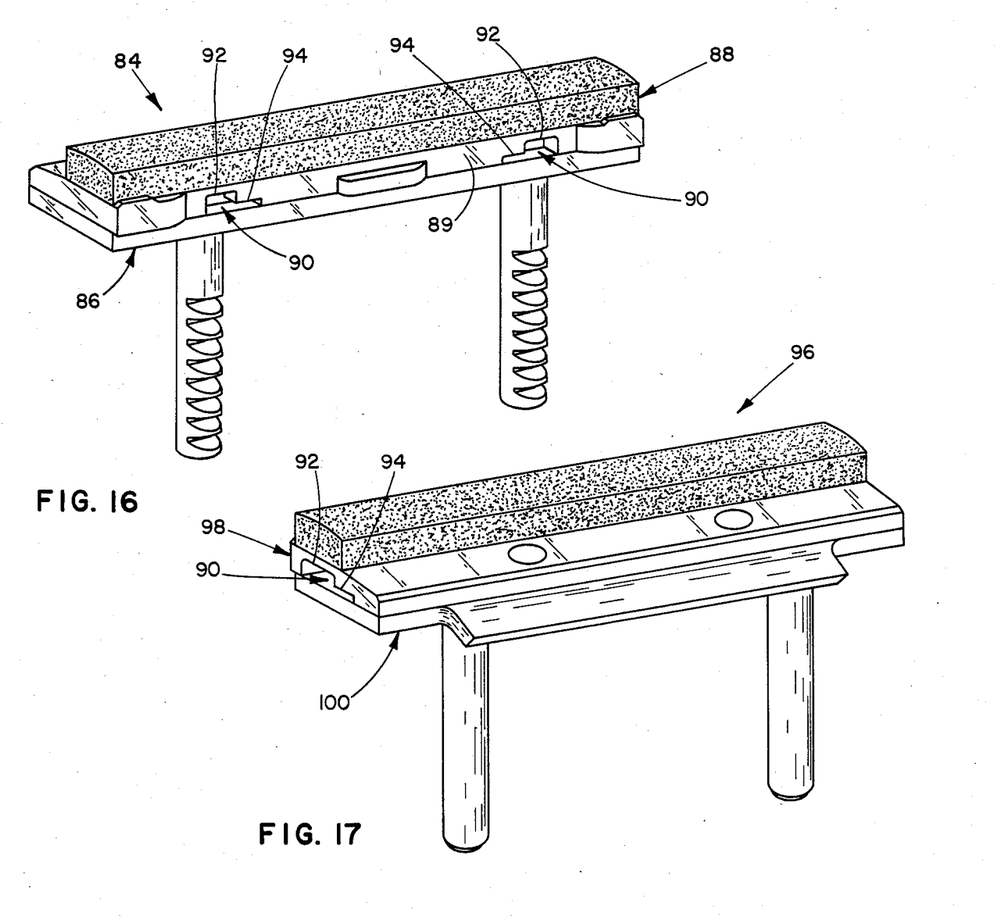
FIG. 16 is a perspective view of an alternative embodiment of the construction shown in FIGS. 1–3, said embodiment having notches formed therein to accommodate a tool used to remove a stone assembly from its master holder.
FIG. 17 is a perspective view similar to FIG. 16 wherein the notches are formed at another location between the stone assembly and the master holder.

FIG. 16 is a perspective view of an alternative embodiment 84 of the construction 10 shown in FIGS. 1-3. The embodiment 84 includes a reusable master holder 86 and a replaceable stone assembly 88 for mounting thereon, both of which are drivingly attached to each other according to the teachings of the present invention. The master holder 86 may be substantially identical in construction and operation to the master holder 12 shown in FIGS. 1-5 and the stone assembly 88 is very similar to the stone assembly 14 but differs therefrom in that it includes one or more notches 90 formed in the surface thereof that is adjacent to the master holder 86. The notches 90 are shown positioned adjacent to the side 89 of the stone assembly 88 that is behind the stone. The notch 90 has a step in it so that it forms two different width slot or notch portions 92 and 94 with the adjacent master holder 86. The wider slot portion 92 is dimensioned such that at least the end portion 58 (or 77) of the tool 50 (or 72) is insertable therewithin to enable prying the members apart. The slot portion 94 communicates with the wider slot portion 92 and will accommodate the tool end portion 58 (or 77) to complete the prying apart of the members 86 and 88 after they are initially partly separated. It is generally preferred that a notch 90 be located along the side 89 of the stone assembly 88 in the near vicinity of each respective tubular projection (FIG. 16). The specific locations and shape of the notches 90 as hereinbefore explained will enable sufficient prying force to be exerted in the vicinity of each respective attachment point so as to easily separate the members 86 and 88.

Figure 18:
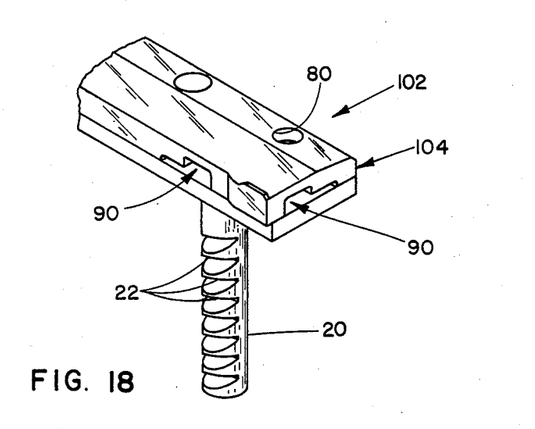
FIG. 18 is a partial perspective view of still another embodiment of the notch constructions shown in FIGS. 16 and 17.

FIGS. 17 and 18 illustrate other embodiments including other locations for the notches 90 in the replaceable stone assemblies for prying it loose from the master holder. FIG. 17 discloses an embodiment 96 which is substantially similar to the embodiment 84 (FIG. 16) except that the notches 90 are located at one or both ends of the stone assembly 98 rather than along a side thereof. In all other respects, the construction and operation of the stone assembly 98 is substantially the same as described above. FIG. 18 illustrates an embodiment 102 wherein the stone assembly 104 includes the notches 90 located on one or both ends and along one side of the assembly 104 to provide an option as to which notches to use to pry the assembly loose. The stone assembly 104 also includes one or more bores or cavities 80 as discussed above. The embodiment 102 therefore incorporates all of the above disclosed means usuable for detaching a stone assembly from its respective master holder.

Figure 19:
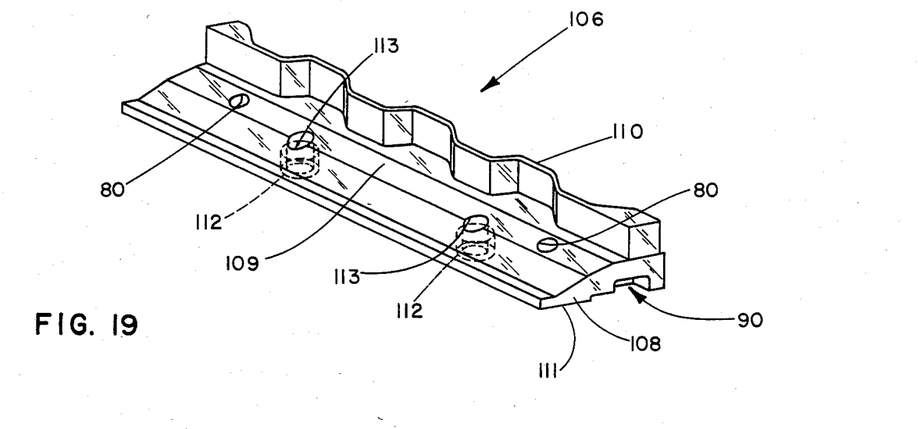
FIG. 19 is a perspective view of one embodiment of a replaceable work engaging guide member for attaching to a master holder according to the teachings of the present invention.

FIG. 19 discloses a replaceable and disposable work engaging guide member 106 which may be attached to and detached from a master holder such as the holders 12, 86 and 100 in a manner similar to the way the stone assemblies are attached. The guide member 106 includes an elongated backing or support portion 108 having a relatively non-abrasive upstanding work engaging portion 110 projecting from one surface thereof and adjacent one side edge, usually the trailing side edge thereof, as shown. The surface 111 of the supporting member 108 opposite the guide portion 110, like the surface 32 of the stone assembly 26, is shaped and dimensioned to mate flush with the adjacent surface of the master holder plate upon which it is to be mounted, and the contour of the opposite surface 109 of the member 108 may be as shown although other contours may be used as desired.

The guide member 106, like the stone assemblies, includes two or more tubular projections 112 extending therefrom for cooperation with bores in the master holder as aforesaid and are expanded in the same way using a tool such as described to make the attachment. Removal of the member 106 from its master holder may likewise be accomplished by any one of the removal methods hereinbefore discussed.

The upstanding work engaging guide portion 110 on the member 106 is shown as having a wavy construction for illustrative purposes. This is done to reduce the amount of material necessary to form the guide without substantially weakening the construction. It is contemplated, however, that the guide portion 110 could have other shapes as well including being an elongated member with parallel sides without departing from the teachings and practice of the present invention. The guide member 106, like the backing member 26 of the stone assembly 14, is preferably constructed of a relatively inexpensive malleable or ductile material such as materials that include zinc or zinc alloys which is characterized by being relatively non-abrasive and more likely to slide on a work surface than to abrade it. Zinc is also a relatively easy material to cast and is generally preferred although other relatively non-abrasive materials such as bronze, brass, certain plastic materials or even wood could be used.

Figure 20:
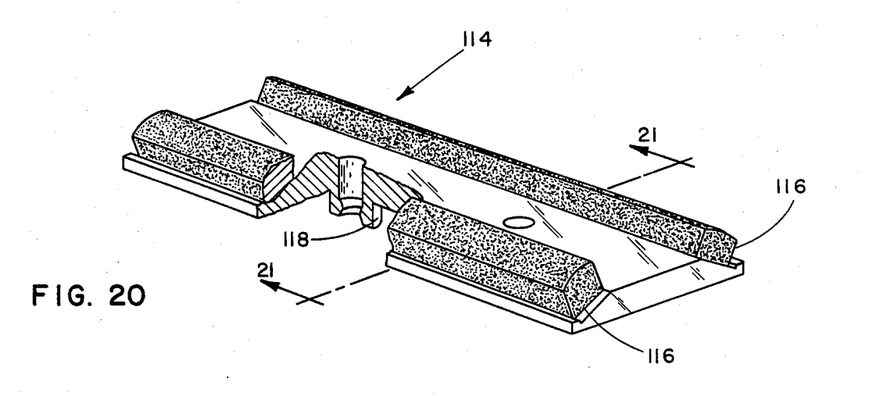
FIG. 20 is a perspective view, partly in section, of a modified stone assembly constructed according to the teachings of the present invention.
Figure 21:
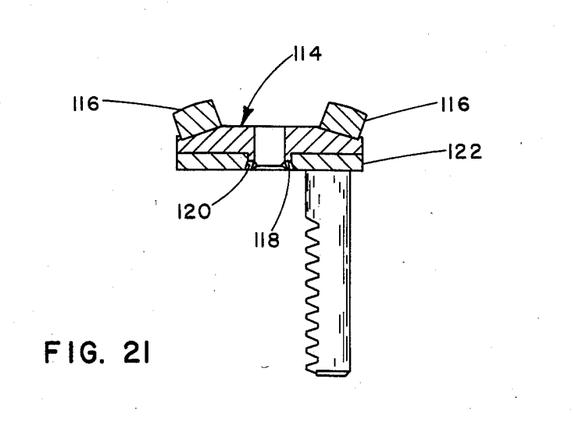
FIG. 21 is a cross-sectional view taken on line 21—21 of FIG. 20 and showing the assembly mounted on a master holder.

FIGS. 20 and 21 illustrate another embodiment of a honing stone assembly 114 which can be mounted to a master holder in the manner of the present construction. The assembly 114 is shown having two spaced parallel stones 116 mounted thereon. The stone assembly 114 is also shown having two spaced tubular projections 118 similar to those described above which cooperate with corresponding bores 120 in master holder plate 122. The construction and operation of the tubular projections 118 and the way they cooperate with the bores 120 to make the attachment or detachment using a suitable tool is substantially identical to the construction and operation of the projections 42 and the bores 24 previously described.

As hereinbefore discussed, the present invention teaches a novel means for attaching replaceable stone and/or guide assemblies to master holders without the use of threaded fastener members or additional parts to accomplish the same. In addition, the present means for attaching and detaching can be accomplished without requiring any dissassembly of the honing mandrel or even removal from the mandrel of the master holders. This can represent a substantial savings in operator time thereby increasing the honing efficiency. The present invention therefore not only provides a simple means for easily and quickly replacing worn stone and/or guide assemblies but it does so in a manner which establishes a positive driving connection between the assemblies and the master holders to which they are attached. It should also be clear that the present mounting means can be utilized for attaching and detaching a wide variety of devices including various disposable machine tool parts and is not limited to attaching honing assemblies and guide assemblies to master holders.

Thus there has been shown and described several different embodiments of a novel mounting means including novel means for mounting work engaging members and the like on support structures therefor which means fulfill all of the objects and advantages sought therefor. Many changes, modifications, variations, and other uses and applications of the present mounting means will, however, become apparent to those skilled in the art after considering this specification and the accompanying drawings, and all such changes, modifications, variations, and other uses and applications which do not depart from the spirit and scope of the invention are deemed to be covered by the invention which is limited only by the claims which follow.

What is claimed is:

1. In a honing device, means for attaching a support member to a backing member comprising a support member having opposed surfaces and at least one round opening located extending therethrough, a backing member mounting at least one work contacting element having at least one round portion projecting therefrom formed integral with the backing member which mates with and is insertable into the round opening in said support member, the number of projecting portions on said backing member corresponding in number and location to the number and location of openings extending through said support member, each of said projecting portions having an opening extending therethrough at least a portion of which has an irregular and non-round cross-sectional shape defined by sidewall portions that extend radially outwardly different distances from the center thereof, said irregularly shaped portions being located in the area of said openings that extend through the openings in said support member, and means substantially corresponding in cross-sectional shape to the cross-sectional shape of the non-round portion of the openings through the projecting portions insertable respectively into each of said projecting portions and means for turning the means insertable to radially outwardly expand and permanently deform the irregularly shaped portion of the projecting portion into intimate engagement with the corresponding opening in said support member.

2. In the honing device defined in claim 1 wherein said backing member and the projecting portions associated therewith are formed of a malleable material.

3. In the honing device defined in claim 1 wherein said insertable means includes a tool member having a portion thereof positioned for extending into the openings extending through said projecting portions, rotation of said tool when said tool portion is positioned extending into one of said projection openings exerting outward pressure on the irregularly shaped portions thereof forcing said portions outwardly into intimate engagement with the openings in said support member.

4. In the honing device defined in claim 3 wherein said tool portion has means associated therewith engageable with said backing member to limit penetration thereof into the openings in said projecting portions.

5. In the honing device defined in claim 3 wherein said tool portion has a cross-sectional shape that permits it to be freely insertable respectively into operative position into each of the openings through said projecting portions in certain positions of angular orientation only.

6. In the honing device defined in claim 1 wherein the opening through the support member has portions of different diameter.

7. In the honing device defined in claim 1 including means forming a slot in said backing member into which a wedging tool can be inserted between said support member and the backing member for applying pressure therebetween to wedge said members apart.

8. In the honing device defined in claim 1 wherein the projecting portions of said backing member extend outwardly therefrom a distance less than the distance between the opposed surfaces of said support member.

9. In the honing device defined in claim 1 wherein the projecting portions of said backing member extend outwardly therefrom a distance greater than the distance between the opposed surfaces of said support member.

10. In the honing device defined in claim 1 including at least one counterbore formed in said backing member at a location spaced from the projecting portions associated therewith for receiving a threaded member used for separating apart said support member from the backing member.

11. In a honing device, means for attaching a backing member formed of a malleable material and mounting at least one work contacting element to a support member, said support member having opposite surfaces and at least two spaced round openings extending therethrough, said malleable member having at least two spaced projecting portions of a cross-sectional shape formed integral with the backing member adapted to be received into the spaced openings through said support member, each of said projecting portions having an opening therein which extends into a corresponding one of the openings in said support member when said projecting portions are placed in registration therewith, the opening in each of said projecting portions having a non-round cross-sectional shape defined by portions of varying cross-sectional contour, said non-round opening portions being located so as to lie within the corresponding openings in said support member when said projecting portions extend into said support member openings, and a tool having a first portion shaped to be extendible in certain positions only into the non-round openings in the projecting portions of said malleable member, said first tool portion having a cross-sectional contour that enables it to extend into said openings but prevents it from freely turning therein, said tool having a second portion forming a handle thereon which, when rotated, enables said first tool portion to be forced into engagement with said non-round opening portions whereby said portions are forced to permanently plastically expand under pressure outwardly into intimate engagement with the corresponding openings in said support member.

12. In the honing device defined in claim 11 wherein the projecting portions of said malleable member are dimensioned to closely fit into the corresponding openings through said support member.

13. In the honing device defined in claim 11 wherein each of the projecting portions has a first end attached to said malleable member and an opposite free end, and at least one axially extending notch formed extending partly therein from the free end thereof to facilitate radial expansion thereof when the first portion of said tool is rotated therein.

14. In the honing device defined in claim 11 wherein the openings extending through said support member are tapered axially over at least a portion of the length thereof.

15. In a honing device, means for attaching a support member to a backing member comprising a support member of plate like construction having at least two round bores extending therethrough at spaced intermediate locations, each of said bores being tapered outwardly over at least a portion of the length thereof, a backing member of a plate like construction mounting at least one work contacting element having a corresponding number of spaced projections formed thereon integral with the backing member at intermediate spaced locations to register with and be extendible into said bores in said plate like support member, each of said projections having an outer cross-sectional diameter that corresponds to the cross-sectional diameter of the corresponding bore through said plate like support member at the location of the smallest diameter thereof, each of said projections having an axial passageway extending therethrough formed at least in part by a non-round portion located in the area thereof that extends through the corresponding bore in said plate like support member, and a tool member having an operator end portion having a cross-sectional shape corresponding to the non-round portions of the passageways through the projections and adapted to be positioned extending through the passageways in said projections, rotation of said tool member when said tool operator end portion is positioned extending through one of the projections and when said projection extends through the corresponding bore in said plate like support member forcing said operator end portion against the non-round portion of the passageway to reshape the non-round portion of said passageway thereat into a more nearly round shape and in so doing permanently deforming some of the material contained therein radially outwardly into intimate engagement with the bore in said plate like support member to form a connection between said support member and the backing member.

16. In the honing device defined in claim 15 wherein the plate like support member is formed of a relatively hard material.

17. In the honing device defined in claim 15 wherein the plate like backing member and the projections formed thereon are formed of a relatively ductile material.

18. In the honing device defined in claim 17 wherein said ductile material includes some zinc.

19. In the honing device defined in claim 15 wherein the non-round portion of the passageways extending through each of said projections is substantially oval in cross-section, and the operator end portion of said tool has a cross-sectional shape that permits it to be freely insertable into operative portion in each of said passageways in certain positions of angular orientation only.

20. In the honing device defined in claim 15 wherein the operator end portion of said tool includes means thereon engageable with the plate like backing member to limit penetration thereof into the passageways in said projections.

21. In the honing device defined in claim 15 wherein the support member and the plate like backing member have adjacent side edges and means forming a slot extending from said adjacent side edges to form a space between said support and backing members into which a wedging tool can be inserted and used for applying pressure to wedge said members apart after joinder.

22. In the honing device defined in claim 15 wherein said plate like backing member includes a counterbore formed extending therein at a location spaced from said spaced projections and on the opposite side thereof from said projections, and a threaded member threadable into the counterbore for applying pressure against the plate like support member in a direction to separate said plate like backing member from said plate like support member.

23. Means for attaching and detaching a dispoable work engaging assembly to a master holder assembly for use on a honing mandrel or the like comprising a disposable work engaging assembly formed of a malleable material including an elongated member having opposed surfaces, at least two spaced tubular projections attached extending outwardly from one of said opposed surfaces to opposite free ends, each of said tubular projections having a substantially cylindrical outer surface and a passageway extending therethrough, said passageway having a portion adjacent the free end of said tubular projections which is non-circular in cross-section, said master holder assembly including an elongated member formed of a relatively hard material having at least two spaced openings extending therethrough at locations to register with and to receive respective ones of the spaced tubular projections on the disposable work engaging assembly, the openings through said master holding member each having at least some portions thereof of different diameter, and an elongated tool having a first end portion substantially corresponding in cross-sectional shape to the shape of the non-circular portion of the passageways through the tubular projections and adapted to be freely positioned extending substantially through the passageways in said tubular projections, said tool having a handle portion connected to said first end portion for rotating said tool when said first end portion is positioned extending through the passageway in one of said tubular projections, rotation of said tool handle portion forcing the non-circular portion of each of said respective tubular projection passageways into a more nearly cylindrical shape whereby at least some of the malleable material associated therewith is permanently plastically forced outwardly into intimate engagement with the respective opening in said master holder assembly.

24. The means defined in claim 23 wherein said disposable work engaging assembly is a honing stone assembly.

25. The means defined in claim 23 wherein said disposable work engaging assembly is a honing guide assembly.

26. The means defined in claim 23 including means forming an exposed slot between the work engaging assembly and the master holder assembly for inserting a portion of a wedging tool therebetween for applying pressure to wedge said members apart.

27. The means defined in claim 23 wherein said disposable work engaging assembly includes at least one counterbore formed in the work engaging assembly at a location therein spaced from said tubular projections and on the opposite side of the assembly from said projections for cooperatively receiving a threaded member used for applying pressure against the master holder assembly to separate said disposable work engaging assembly therefrom.

28. The means defined in claim 27 wherein said elongated tool includes a threaded end portion on said handle portion, said threaded end portion being threadedly engageable with said counterbore.

29. In a honing assembly, means for attaching a backing member formed of a malleable material to a harder support member and mounting at least one work contacting element, said support member having opposite surfaces and at least two spaced openings extending therethrough between said opposite surfaces, said malleable member having a number of integrally formed projecting portions thereon corresponding in number and location to the openings in the support member and at locations and of size to register with and to be received into the openings through said support member, each of said projecting portions having an opening therethrough at least a portion of which is smaller in cross-sectional size than the rest of said opening and non-round in shape, the smaller cross-sectional opening portion of each opening being located so as to lie within a corresponding opening in said support member when the projecting portions are positioned extending therein, and means including a tool having a work engaging portion adapted to be forced into engagement with the reduced cross-sectional opening portion of each projecting portion to permanently plastically deform and force the malleable material thereat to expand outwardly into intimate engagement with the opening in said support member.

* * * * *

UNITED STATES PATENT OFFICE
CERTIFICATE OF CORRECTION

Patent No. 4,555,875          Dated December 3, 1985

Inventor(s) Robert M. Sunnen and Duane W. Woltjen

It is certified that error appears in the above-identified patent and that said Letters Patent are hereby corrected as shown below:

Column 16, line 19, delete the word "dispoable" and substitute therefore the word -- disposable --.

Column 16, line 25, replace the word "attached" with the phrase -- integrally formed with said elongated member --.

*Signed and Sealed this*

*Twenty-fifth* Day of *February 1986*

[SEAL]

Attest:

DONALD J. QUIGG

*Attesting Officer*      *Commissioner of Patents and Trademarks*